United States Patent
Minkara et al.

(10) Patent No.: US 10,611,684 B2
(45) Date of Patent: Apr. 7, 2020

(54) RECOVERY AND BENEFICIATION OF POZZOLAN DEPOSITS FOR ENHANCED PERFORMANCE IN CONCRETE

(71) Applicant: Headwaters Incorporated, South Jordan, UT (US)

(72) Inventors: Rafic Y. Minkara, Keenesaw, GA (US); Eleazar Ivan Diaz-Loya, Taylorsville, GA (US); Douglas S. Rhodes, Taylorsville, GA (US)

(73) Assignee: Headwaters Incorporated, South Jordan, UT (US)

( * ) Notice: Subject to any disclaimer, the term of this patent is extended or adjusted under 35 U.S.C. 154(b) by 185 days.

(21) Appl. No.: 15/751,100

(22) PCT Filed: Aug. 8, 2016

(86) PCT No.: PCT/US2016/046081
§ 371 (c)(1),
(2) Date: Feb. 7, 2018

(87) PCT Pub. No.: WO2017/027483
PCT Pub. Date: Feb. 16, 2017

(65) Prior Publication Data
US 2019/0337849 A1     Nov. 7, 2019

Related U.S. Application Data

(60) Provisional application No. 62/202,349, filed on Aug. 7, 2015.

(51) Int. Cl.
| | | |
|---|---|---|
| *C04B 18/08* | (2006.01) | |
| *C04B 20/02* | (2006.01) | |
| *C04B 28/02* | (2006.01) | |

(52) U.S. Cl.
CPC ............ *C04B 18/08* (2013.01); *C04B 20/023* (2013.01); *C04B 20/026* (2013.01); *C04B 28/021* (2013.01)

(58) Field of Classification Search
CPC ..... C04B 18/08; C04B 20/023; C04B 20/026; C04B 28/021
See application file for complete search history.

(56) References Cited

U.S. PATENT DOCUMENTS

| | | |
|---|---|---|
| 5,928,420 A | 7/1999 | Oates et al. |
| 2006/0201395 A1 | 9/2006 | Barger et al. |
| 2007/0215353 A1* | 9/2007 | Barron .................... C04B 18/08 |
| | | 166/292 |
| 2011/0065854 A1 | 3/2011 | Mohamed et al. |
| 2012/0298011 A1 | 11/2012 | Silva et al. |

FOREIGN PATENT DOCUMENTS

| | | |
|---|---|---|
| CN | 101050076 A | 10/2007 |
| KR | 10-1346561 B1 * | 2/2014 |
| WO | WO 98/51640 A1 | 11/1998 |

OTHER PUBLICATIONS

International Search Report issued in International Application No. PCT/US/2016/046081 dated Aug. 5, 2017.
Written Opinion of the International Searching Authority in International Application No. PCT/US2016/046081 dated Jan. 17, 2017.

* cited by examiner

*Primary Examiner* — Anthony J Green
(74) *Attorney, Agent, or Firm* — Bookoff McAndrews, PLLC

(57) ABSTRACT

Disclosed is a method for enhancing the performance of concrete includes, providing a cementitious mixture comprising cement and processed high calcium fly ash; wherein a processing of the processed high calcium fly ash neutralizes a cementitious reactivity of a high calcium fly ash, wherein a pozzolanic reactivity of the processed high calcium fly ash is maintained during the processing of the high calcium fly ash. The processing of the high calcium fly ash includes hydrating and carbonating the high calcium fly ash. The processing further includes excavating the high calcium fly ash from a landfill or surface impoundment after the hydrating and carbonating. Also disclosed is a portland-pozzolan blended cement mixture with clinker, gypsum, and a pozzolanic material, such as processed high calcium fly ash. After processing, the cementitious reactivity of a high calcium fly ash is neutralized, while pozzolanic reactivity of the high calcium fly ash is maintained.

18 Claims, 10 Drawing Sheets

RECOVERY AND BENEFICIATION OF POZZOLAN DEPOSITS FOR ENHANCED PERFORMANCE IN CONCRETE

CROSS-REFERENCE TO RELATED APPLICATION

This application claims the priority benefit of Application No. PCT/US2016/046081, filed on Aug. 8, 2016, which claims the priority benefit of U.S. Provisional Patent Application Ser. No. 62/202,349, filed Aug. 7, 2015 and titled RECOVERY AND BENEFICATION OF POZZOLAN DEPOSITS FOR ENHANCED PERFORMANCE IN CONCRETE, which is incorporated by herein.

FIELD OF INVENTION

This patent application pertains to the processing and use of processed high calcium fly ash to enhance performance in concrete.

BACKGROUND OF INVENTION

Fly ash, the finely divided material collected by electrostatic precipitators from the flue gases at coal-fired power plants, has become an essential component of concrete. Concrete proportioned with fly ash shows improved performance not attainable by the use of hydraulic cement alone. Fly ash has physical and chemical synergistic effects with hydraulic cement in concrete. The type and extent of these effects depend on the particle size distribution and chemical composition of fly ash. Fly ash is classified based on its chemical composition into two categories: class F and C, per ASTM C 618. Generally, class F fly ashes have a predominant alumino-silicate glass phase which provides pozzolanic properties while class C fly ashes have a predominant calcium-alumino-silicate glass phase which is pozzolanic as well as cementitious.

The effects assumed primarily dependent of a physical interaction, such as improved workability, are the similar regardless of the type of fly ash. Conversely, the effects assumed primarily dependent on a chemical interaction such as time of setting in fresh state and temperature rise in hardened state are different depending on the type of fly ash and calcium content (CaO). This unpredictability of fly ash behavior increases as the calcium content (CaO) of the fly ash increases, which leads to higher hydraulic reactivity. Accordingly, the use high calcium fly ash in cement has traditionally been very challenging due to the high hydraulic reactivity associated with the high reactive calcium content in the high calcium fly ash.

SUMMARY OF INVENTION

According to one aspect of the present invention, a method for enhancing the performance of concrete includes, providing a cementitious mixture comprising cement and processed high calcium fly ash; wherein a processing of the processed high calcium fly ash neutralizes a cementitious reactivity of a high calcium fly ash, wherein a pozzolanic reactivity of the processed high calcium fly ash is maintained during the processing of the high calcium fly ash. The processing of the high calcium fly ash includes hydrating and carbonating the high calcium fly ash. The processing further includes excavating the high calcium fly ash from a landfill or surface impoundment after the hydrating and carbonating.

In another aspect of the invention a calcium oxide content of the high calcium fly ash is greater than about 10% or 15% prior to the neutralization of the cementitious reactivity of the high calcium fly ash.

In another aspect of the invention, about 30-60% of the cement in the cementitious mixture is replaced with the processed high calcium fly ash, and a set time of the cementitious mixture is less than or equal to about 120% of the set time of a control, the control is 100% cement. Replacing the cement in the cementitious mixture with the processed high calcium fly ash reduces a risk of an alkali-silica reaction in the cementitious mixture. The set time of the cementitious mixture is less than or equal to about 110% or 120% of the set time of the control.

In another aspect of the invention, greater than about 5% of the cement in the cementitious mixture is replaced with the processed high calcium fly ash, and a set time of the cementitious mixture is between about 105-120% of the set time of a control, the control is 100% cement. Replacing the cement in the cementitious mixture with the processed high calcium fly ash reduces a risk of an alkali-silica reaction in the concrete when compared to the control, reduces an amount of $CO_2$ embodied in the concrete when compared to the control, and reduces the amount of energy embodied in the concrete when compared to the control.

In another aspect of the invention, the processed high calcium fly ash is included of primary ettringite and/or calcite, thereby increasing its effectiveness in reducing a risk of sulfate attack in the concrete.

In another aspect of the invention, a set time and an optimum sulfate content of the cementitious mixture is regulated by blending the cement with the processed high calcium fly ash, and a source of sulfate.

In another aspect of the invention, the set time and the optimum sulfate content of the cementitious mixture is further regulated by blending virgin fly ash with the cement, the processed high calcium fly ash, and a source of sulfate. The virgin fly ash and the processed fly ash are combined by blending or inter-grinding virgin fly ash and processed fly ash.

In another aspect of the invention, the cementitious mixture requires less than 105 or 110% of the water required by a control, when the cementitious mixtures contains about 20% processed high calcium fly ash and about 80% cement, wherein the control is a cementitious mixture with 100% cement.

In another aspect of the invention, the processing of the high calcium fly ash further includes grinding the high calcium fly ash after neutralization and hydration, wherein the grinding of the high calcium fly ash during the processing exposes a particle surface on the high calcium fly ash with sites for pozzolanic reactions to occur.

In another aspect of the invention, a specific surface area of the particle surface is between about 1.5-15 $m^2/g$, 2-10 $m^2/g$, or 3-5 $m^2/g$ after the grinding.

In another aspect of the invention, the cementitious mixture is included of about 20% processed high calcium fly ash and about 80% cement, wherein a compressive strength of the cementitious mixture is greater than about 70% or 80% of a compressive strength of a control, wherein the control is a cementitious mixture with 100% cement.

In another aspect of the invention, the cementitious mixture has at least about 5% or 10% less calcium hydroxide per gram of cement than a control at 28 days after hydration, wherein the control is a cementitious mixture with 100% cement.

In another aspect of the invention, the cementitious mixture is included of cement, processed high calcium fly ash, and virgin high calcium fly ash. The virgin fly ash and the processed fly ash are combined by blending or inter-grinding virgin fly ash and processed fly ash.

In another aspect of the invention, a ratio of processed high calcium fly ash:virgin high calcium fly ash in the cementitious mixture is about 50:50, 80:20, or 65:35.

According to yet another aspect of the invention, a portland-pozzolan blended cement mixture includes clinker, gypsum, and a pozzolanic material, the pozzolanic material including processed high calcium fly ash. A processing of the processed high calcium fly ash neutralizes a cementitious reactivity of a high calcium fly ash while maintaining a pozzolanic reactivity of the high calcium fly ash.

In another aspect of the invention, the clinker is ground at a cement plant and blended with the gypsum and virgin fly ash and the processed high calcium fly ash.

In another aspect of the invention, the clinker is ground at a cement plant and blended with the gypsum and fly ash and the processed high calcium fly ash.

In another aspect of the invention, the processing of the high calcium fly ash includes hydrating and carbonating the high calcium fly ash. The processing further includes excavating the high calcium fly ash from a landfill or surface impoundment after the hydrating and carbonating.

In another aspect of the invention, the calcium oxide content of the high calcium fly ash is greater than about 10% or 15% prior to the neutralization of the cementitious reactivity of the high calcium fly ash.

In another aspect of the invention, about 30-60% of the cement in the cement mixture is replaced with the processed high calcium fly ash, and a set time of the cement mixture is less than or equal to about 120%, 110%, or 105% of the set time of a control, the control is 100% cement. Replacing the cement in the cement mixture with the processed high calcium fly ash reduces a risk of an alkali-silica reaction in the cement mixture.

In another aspect of the invention, wherein greater than about 5% of the cement in the cement mixture is replaced with the processed high calcium fly ash, and a set time of the cement mixture is between about 105-120% of the set time of a control, the control is 100% cement. Replacing the cement in the cement mixture with the processed high calcium fly ash reduces a risk of an alkali-silica reaction compared to the control, reduces an amount of $CO_2$ embodied in the cement when compared to the control, and reduces the amount of energy embodied in the cement when compared to the control.

In another aspect of the invention, the processed high calcium fly ash is included of primary ettringite and/or calcite, thereby reducing a risk of sulfate attack.

In another aspect of the invention, a set time and an optimum sulfate content of the cement mixture is regulated by blending the cement with the processed high calcium fly ash and the clinker.

In another aspect of the invention, the set time and the optimum sulfate content of the cementitious mixture is further regulated by blending virgin fly ash with the cement, the processed high calcium fly ash, and the clinker. The virgin fly ash and the processed fly ash are combined by blending or inter-grinding virgin fly ash and processed fly ash.

In another aspect of the invention, the cement mixture requires less than 110% or 105% of the water required by a control, when the cement mixtures contains about 20% processed high calcium fly ash and about 80% cement, wherein the control is a cement mixture with 100% cement.

In another aspect of the invention, the processing of the high calcium fly ash further includes grinding the high calcium fly ash after neutralization and hydration, wherein the grinding of the high calcium fly ash during the processing exposes a particle surface on the high calcium fly ash with sites for pozzolanic reactions to occur.

In another aspect of the invention, wherein a specific surface area of the particle surface is between about 1.5-15 $m^2/g$, 2-10 $m^2/g$, or 3-5 $m^2/g$ after the grinding.

In another aspect of the invention, the cement mixture is included of about 20% processed high calcium fly ash and about 80% cement, wherein a compressive strength of the cement mixture is greater than about 70% or 80% of a compressive strength of a control, wherein the control is a cement mixture with 100% cement.

In another aspect of the invention, the cement mixture is included of about 20%, 10% or 5% processed high calcium fly ash and about 80% cement, wherein the cement mixture has at least about 3% less calcium hydroxide per gram of cement than a control at 28 days after hydration, wherein the control is a cement mixture with 100% cement.

In another aspect of the invention, the cement mixture is included of cement, processed high calcium fly ash, and virgin high calcium fly ash. The virgin fly ash and the processed fly ash are combined by blending or inter-grinding virgin fly ash and processed fly ash. The ratio of processed high calcium fly ash:virgin high calcium fly ash in the cement mixture is about 50:50, 80:20, or 65:35.

In yet another aspect of the invention, method for processing high calcium fly ash includes reclaiming high calcium fly ash, wherein the high calcium fly ash is hydrated and neutralized before reclaiming. The processing of the high calcium fly ash neutralizes a cementitious reactivity of the high calcium fly ash, while pozzolanic reactivity of the high calcium fly ash is maintained during the processing of the high calcium fly ash.

In another aspect of the invention, the processing of the high calcium fly ash includes hydrating and carbonating the high calcium fly ash; and the reclaiming includes excavating the high calcium fly ash from a landfill or surface impoundment after the hydrating and carbonating.

In another aspect of the invention, the processing of the high calcium fly ash further includes grinding the high calcium fly ash after excavating the high calcium fly ash, wherein the grinding of the high calcium fly ash during the processing exposes a particle surface on the high calcium fly ash with sites for pozzolanic reactions to occur.

In another aspect of the invention, a specific surface area of the particle surface is between about 1.5-15 $m^2/g$, 2-10 $m^2/g$, or 3-5 $m^2/g$ after the grinding.

In another aspect of the invention, the processing of the high calcium fly ash includes drying and crushing the high calcium fly ash before the grinding.

In another aspect of the invention, the processing of the high calcium fly ash further includes grinding clinker at a cement plant and blending with the gypsum and virgin fly ash and the processed high calcium fly ash.

In another aspect of the invention, the processing of the high calcium fly ash includes hydrating and carbonating the high calcium fly ash. The processing of the high calcium fly ash further includes grinding the high calcium fly ash after hydrating and carbonating the high calcium fly ash, wherein the grinding of the high calcium fly ash during the processing exposes a particle surface on the high calcium fly ash with sites for pozzolanic reactions to occur.

In another aspect of the invention, the processing of the high calcium fly ash includes drying and crushing the high calcium fly ash before the grinding.

In another aspect of the invention, the processing of the high calcium fly ash further includes grinding clinker at a cement plant and blending with the gypsum and virgin fly ash and the processed high calcium fly ash.

In another aspect of the invention, the calcium oxide content of the high calcium fly ash is greater than about 10% prior to the neutralization of the cementitious reactivity of the high calcium fly ash.

In another aspect of the invention, the high calcium fly ash is included of primary ettringite and/or calcite after the processing, thereby increasing its effectiveness in reducing a risk of sulfate attack in concrete.

In another aspect of the invention, the particle size distribution of the high calcium fly ash after processing is similar to that of virgin or as-produced run-of-plant fresh high calcium fly ash.

Other advantages and benefits will be apparent to one skilled in the art when reviewing the specification in combination with the drawings as described herein.

BRIEF DESCRIPTION OF THE DRAWINGS

The invention will be further described in the appended drawings and following detailed description. In the drawings.

DETAILED DESCRIPTION

Approximating language, as used herein throughout the specification and claims, may be applied to modify any quantitative representation that could permissibly vary without resulting in a change in the basic function to which it is related. Accordingly, a value modified by a term or terms, such as "about", is not limited to the precise value specified. In at least some instances, the approximating language may correspond to the precision of an instrument for measuring the value. Range limitations may be combined and/or interchanged, and such ranges are identified and include all the sub-ranges stated herein unless context or language indicates otherwise. Other than in the operating examples or where otherwise indicated, all numbers or expressions referring to quantities of ingredients, reaction conditions and the like, used in the specification and the claims, are to be understood as modified in all instances by the term "about".

As used herein, the terms "comprises", "comprising", "includes", "including", "has", "having", or any other variation thereof, are intended to cover a non-exclusive inclusion. For example, a process, method, article or apparatus that comprises a list of elements is not necessarily limited to only those elements, but may include other elements not expressly listed or inherent to such process, method, article, or apparatus.

The singular forms "a", "an", and "the" include plural referents unless the context clearly dictates otherwise.

Figure 1:
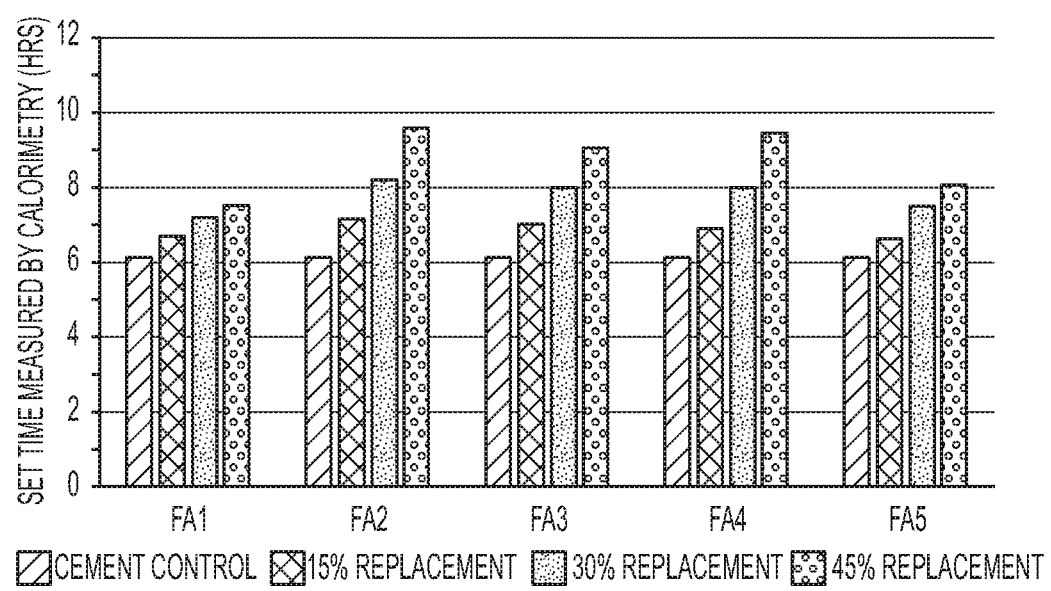
FIG. 1 is a chart showing the effect of virgin high calcium fly ash at different replacement values on the set time of cement paste.

As was stated above, the use of high calcium fly ash in concrete has traditionally been very challenging due to the high hydraulic reactivity associated with the high reactive calcium content in the high calcium fly ash. In an exemplary embodiment, the reactive calcium can include calcium oxide (CaO). Further, reactive calcium can also include calcium aluminate, such as when the high calcium fly ash is reacted with cement. In one exemplary embodiment, high calcium fly ash can include fly ash having a reactive calcium content greater than about 5% (calcium oxide (CaO) greater than about 5%). In another exemplary embodiment, high calcium fly ash can include fly ash having a reactive calcium content greater than about 10% (calcium oxide (CaO) greater than about 10%). In a further exemplary embodiment, high calcium fly ash can include fly ash having a reactive calcium content greater than about 15% (calcium oxide (CaO) greater than about 15%). High calcium fly ash can include class C fly ash and also class F fly ash with a sufficient reactive calcium (calcium oxide) content. One of the most conspicuous effects high calcium fly ash can have in concrete is abnormal set times. Although many factors affect setting behavior such as water-to-cement ratio, temperature, amount of cementitious material, chemical admixtures and type of cement being used, the chemical composition and amount of high calcium fly ash in concrete play a dominant role in the extent of this set time offset. FIG. 1 shows the effect of five high calcium class C fly ashes from different sources, designated as FA 1 through FA 5, at different replacement levels on cement paste. As can be seen upon review of FIG. 1, the five high calcium fly ashes increased the time of set for the cement paste, and this effect is even more pronounced as the replacement level of cement with class C fly ash increases.

Delayed set times can significantly affect the rate of construction. In concrete that requires finishing, the timing of the operations may be delayed resulting increased labor costs. It can also affect the overall construction schedule, which can cause concrete producers and contractors to incur fines due to delays. Currently, concrete producers limit the amount of class C fly ash in concrete to maintain predictability and minimize abnormal set times.

Set times can also be affected by the sulfate content in cementitious systems. The optimum sulfate content of cement/fly ash cementitious systems is highly dependent on the amount of soluble sulfur and calcium aluminate in fly ash. Sulfate in fly ash will contribute to reach the optimum sulfate content while calcium aluminates will increase the sulfate demand. Most high calcium fly ashes, such as class C fly ash, have a net positive sulfate demand, therefore cement/fly ash systems will increasingly depart from the optimum sulfate content as the amount of high calcium fly ash with respect to cement is increased, which can result in flash set and/or lower quality concrete compared to a concrete made with a cementitious system with an optimum sulfate content.

Traditionally, class C fly ash has not been as effective at reducing the risk of sulfate attack in concrete as class F fly ash. More specifically, the presence of reactive calcium aluminosilicates within class C fly ash can form monosulfate and calcium aluminate hydrates, which are susceptible to sulfate attack.

In one exemplary embodiment, a method for processing high calcium fly ash is disclosed whereby the variability of the effects of high calcium fly ash in concrete is mitigated due to the neutralization of the hydraulic activity in the high calcium fly ash by neutralizing the reactive calcium while maintaining pozzolanic reactivity in the high calcium fly ash, when compared to virgin or as-produced run-of-plant fresh high calcium fly ash. This process involves hydrating of high calcium fly ash in a landfill or surface impoundment, carbonating the hydrates and/or free lime in the high calcium fly ash with atmospheric carbon dioxide, and subsequently excavating the material and grinding it to a particle size distribution similar to that of virgin or as-produced run-of-plant fresh high calcium fly ash.

The objective of this processing is to hydrate the reactive calcium in the high calcium fly ash in network modifier roles, thereby reducing or nullifying further hydraulic reactions. The hydrates generated during this processing may carbonate over time, especially when exposed to the environment. Since the high calcium fly ash is reacted in the absence of hydraulic cement and thus without the required calcium hydroxide and alkalinity provided by the cement for the pozzolanic reaction to take place, the pozzolanic sites are left unreacted. Then, by grinding the hardened high calcium fly ash, these pozzolanic sites are re-exposed. The resulting particle size distribution is such that desirable effects inherent to virgin fly ash are returned to the processed fly ash. Furthermore, fine calcium carbonate ($CaCO_3$) present in processed fly ash promotes heterogeneous hydration by providing nucleation sites. This unexpected result goes against traditional thinking in the industry, which is that carbonating high calcium fly ash, such as in a landfill or surface impoundment eliminates any (reacts all available) pozzolanic sites within the high calcium fly ash.

The method of processing the high calcium fly ash can include the recovery and beneficiation (reclamation) of high calcium fly ash from landfills or surface impoundments that has been hydrated and carbonated. The recovery process includes drying, milling and storing of the hydrated and carbonated high calcium fly ash. The processed high calcium fly ash enhances the performance of concrete. More specifically, the processed high calcium fly ash effectively mitigates alkali-silica reaction (ASR), reduces the risk of sulfate attack, and enhances early hydration in concrete, without increasing the set time of the concrete. Therefore, the processed high calcium fly ash can be used to regulate set time by introducing the processed high calcium fly ash either as a separate addition to concrete or as set-regulated fly ash-PFA blend.

Further, some exemplary embodiments methods for the processing of the high calcium fly ash can include excavating the hydrated and carbonated high calcium fly ash, drying the high calcium fly ash, and inter-grinding the high calcium fly ash with clinker and gypsum to obtain a set-regulated fly ash-cement blend with an optimum sulfate content. This method of processing high calcium fly ash will be discussed in more depth below.

As will be discussed further below, this processing of the high calcium fly ash also promotes the consumption of the readily soluble sulfate in the high calcium fly ash, which leads to the formation of primary ettringite (stable ettringite) in the processed high calcium, fly ash. Research has shown that such ettringite formed at early ages (primary ettringite) is a stable reaction product. Primary ettringite is ettringite that is present in cement within the first few hours of mixing. Primary ettringite is a beneficial component of portland cement systems, since it helps to control stiffening in fresh, plastic concrete. Primary ettringite is generally uniformly and discretely dispersed throughout the cement paste at a submicroscopic level (less than a micrometer in cross-section). Primary ettringite is contrasted with delayed ettringite, which can be formed in cement later ages (after the first few hours of mixing) by calcium hydroxide reacting with soluble sulfur.

Thus, the formation of primary ettringite in the processed high calcium fly ash indicates that the processed high calcium fly ash is not susceptible to sulfate attack. Accordingly, the method of processing of the high calcium fly ash described herein results in the formation of primary ettringite in the processed high calcium fly ash, which reduces the risk of sulfate attack in concrete containing the processed high calcium fly ash. Thereby, processing increases the effectiveness of the high calcium fly ash at reducing the risk of sulfate attack in concrete. This is unlike virgin or as-produced run-of-plant (unprocessed) high calcium fly ash, in which monosulfate hydrates and calcium aluminate hydrates may form, instead of primary ettringite. Monosulfate hydrates and calcium aluminate hydrates are susceptible to sulfate attack.

Figure 2:
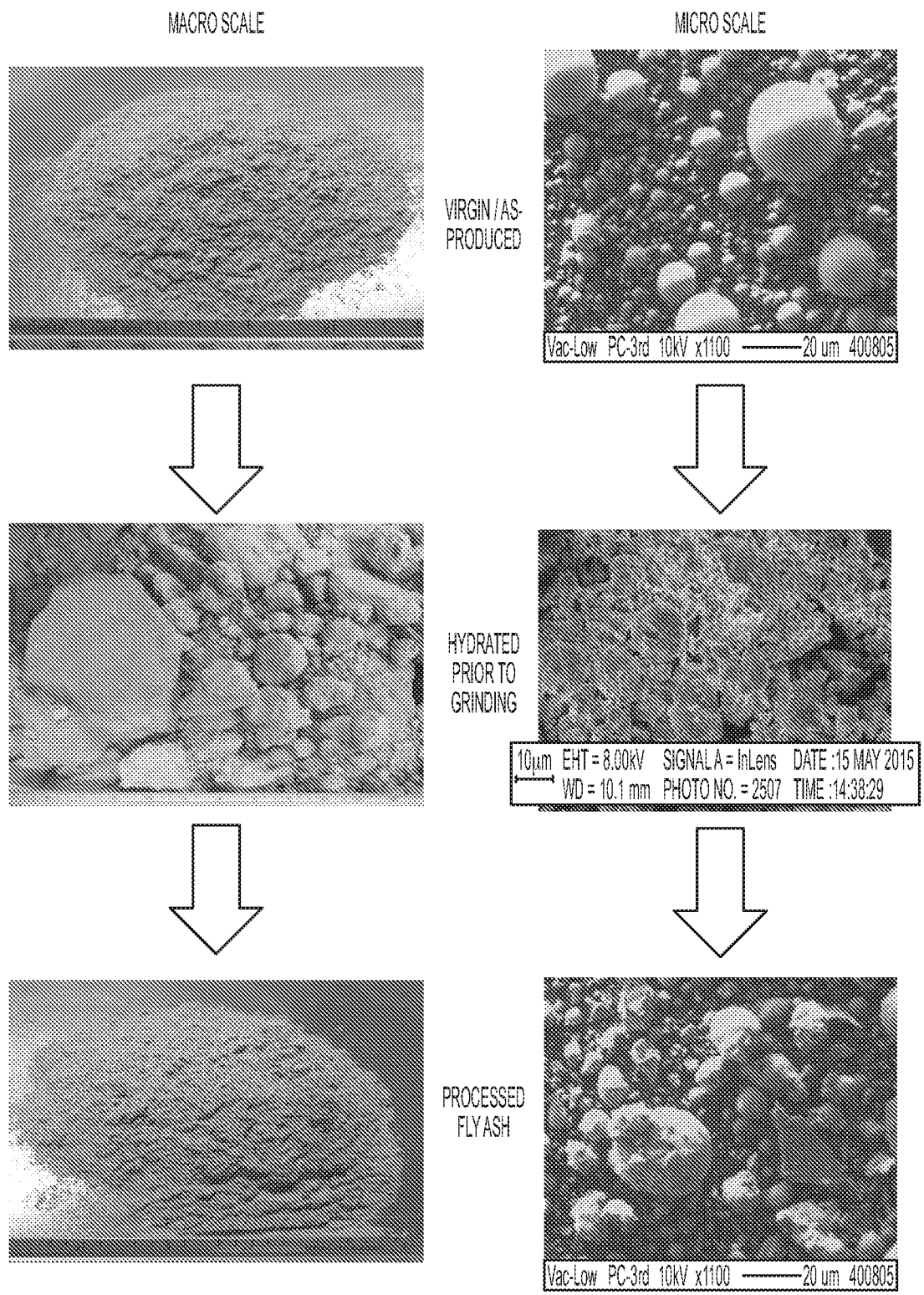
FIG. 2 is photographs at the macro and micro scale of virgin, hydrated, and processed high calcium fly ash in accordance with an exemplary embodiment of the invention.

FIG. 2 shows photographs of the high calcium fly ash at both macro and micro zoom levels, with the left column showing the high calcium fly ash at the macro scale and the right column showing the high calcium fly ash at the micro scale. More specifically, the top two pictures of FIG. 2 show the virgin high calcium class C fly ash prior to processing. The middle two pictures show the high calcium class C fly ash after hydration, but prior to grinding. The lower two pictures show the high calcium class C fly ash after processing (processed high calcium class C fly ash) in both columns.

Since at least part of the readily soluble sulfate in the high calcium fly ash is consumed during processing to form primary ettringite, the consumed sulfate is not available for balancing the sulfate content in cementitious systems containing the processed high calcium fly ash. Accordingly, an external source of sulfate may be added during processing to optimize the sulfate content of the processed high calcium fly ash. In some exemplary embodiments, the external source of sulfate may be gypsum. Further, in other exemplary embodiments, clinker can be inter-ground with pulverized fly ash (PFA) and gypsum to make a blended cement.

Figure 3:
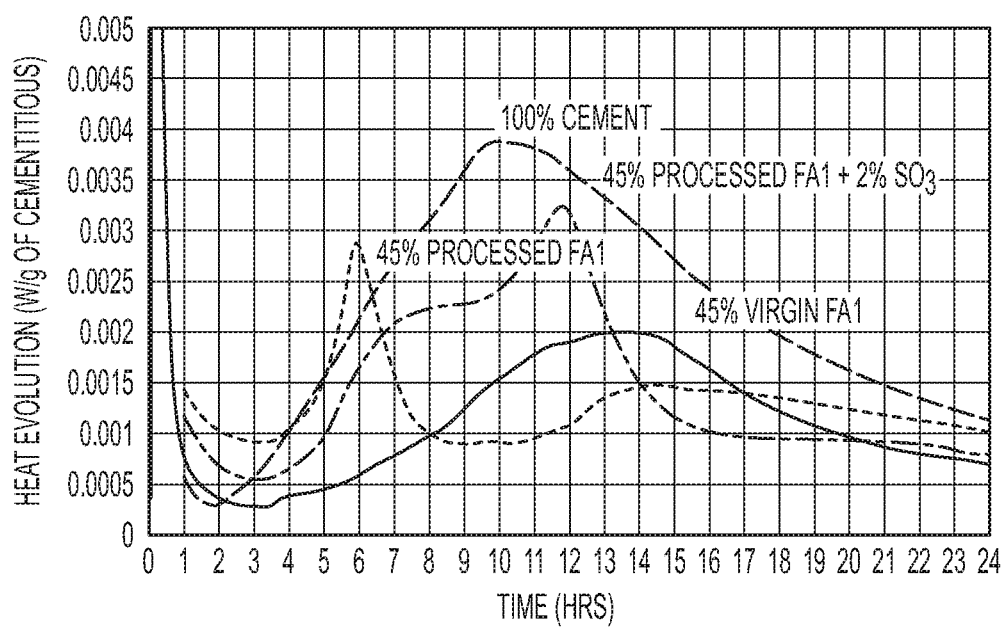
FIG. 3 is a graph showing the heat evolution of cement control and cement paste blends containing high calcium fly ash with the x-axis showing time after hydration in accordance with an exemplary embodiment of the invention.

As is shown in FIG. 3, the addition of sulfate during high calcium fly ash processing may also be used to regulate and optimize setting time and strength of the cement in which the processed high calcium fly ash is present. Sulfate can be incorporated by intergrinding hardened high calcium fly ash and clinker with a source of sulfate during processing, or blending the high calcium fly ash and cement with a source of sulfate during or after processing. FIG. 3 shows the heat evolution of cement paste with a 45% replacement of processed high calcium class C fly ash from source FA1. This heat evolution profile is typical of an under-sulfated system. Upon comparing the 45% processed FA1 and 45% Processed FA1+2% $SO_3$ traces in FIG. 3, the graph demonstrates that the addition of 2% calcium sulfate can turn the premature exotherm peak shown for cement paste with a 45% replacement of processed high calcium class C fly ash from source FA1 to a heat evolution peak akin that of a well-balanced cement-fly ash-sulfate system, such as 100% cement.

Figure 4:
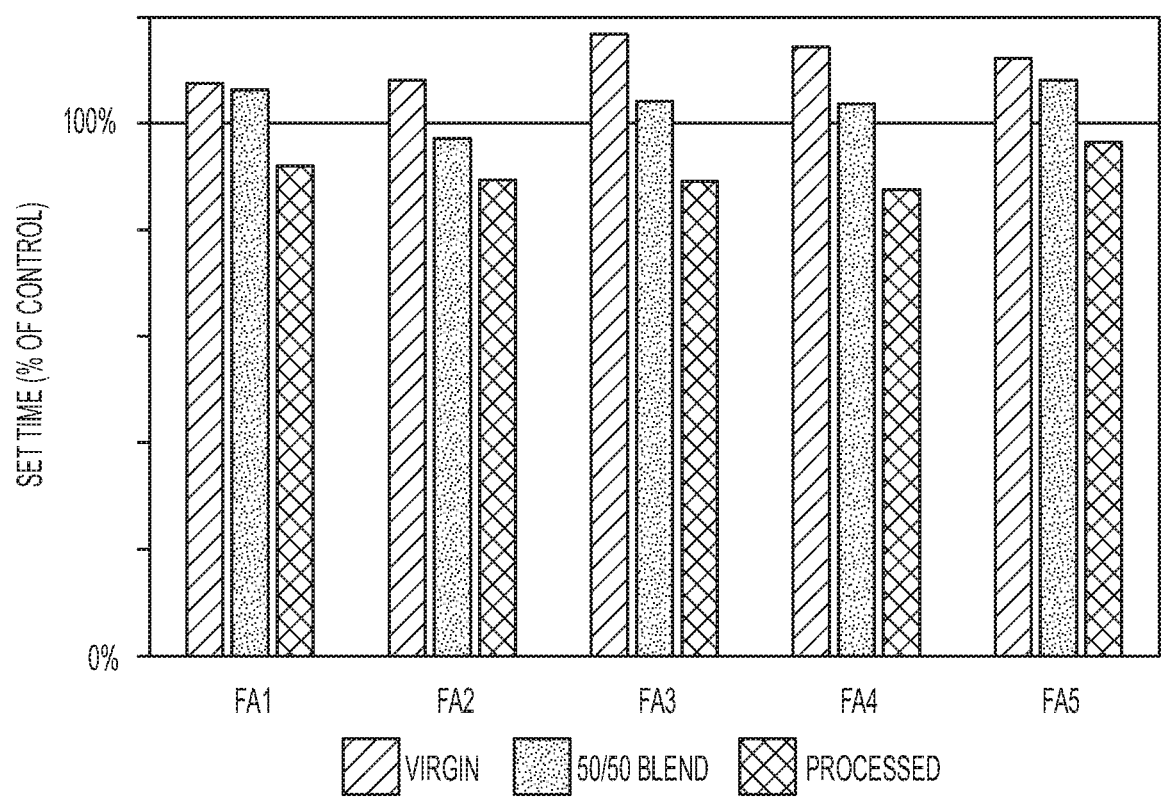
FIG. 4 is a chart showing the effect on the set time of cement paste containing 15% of virgin high calcium fly ash compared to processed high calcium fly ash and a blend of 50% virgin and 50% processed high calcium fly ash from five different sources with the y-axis showing the time of set as a percentage of the set time of a 100% cement paste in accordance with an exemplary embodiment of the invention.

In some exemplary embodiments, processed high calcium fly ash can be mixed with virgin fly ash, such as virgin high calcium fly ash. This mixture can be used to partially replace cement in a blended cement mixture, thereby regulating the set time of the concrete in which it is used. FIG. 4 is a chart showing the effect on the set time of cement paste containing 15% of virgin high calcium fly ash compared to processed high calcium fly ash and a blend of 50% virgin and 50% processed high calcium fly ash from five different sources, designated as FA 1 through FA 5. The y-axis shows the time of set as a percentage of the set time of a 100% cement paste.

FIG. 4 shows the effects that virgin and processed high calcium fly ashes from different sources have on set time of cement paste at a 15% replacement level. FIG. 4 also shows a 50/50 blend thereof of virgin and processed high calcium fly ashes, which exhibits lesser set time offset than its two counterparts. The blend ratio of virgin and processed fly ash can be adjusted to achieve the desired set time. Accordingly, by adjusting the mixture (blend) of virgin and processed high calcium fly ash that partially replaces cement, the same set time can be achieved as the control (100% cement only).

Therefore, FIG. 4 demonstrates that partially replacing cement with processed high calcium fly ash can slightly reduce the time of set compared to a 100% cement mixture. Conversely, partially replacing cement with virgin high calcium fly ash typically generates mixtures with longer set times. Therefore, by blending virgin fly ash with processed high calcium fly ash, set times for the cement containing the blended fly ash can be optimized.

Figure 5:
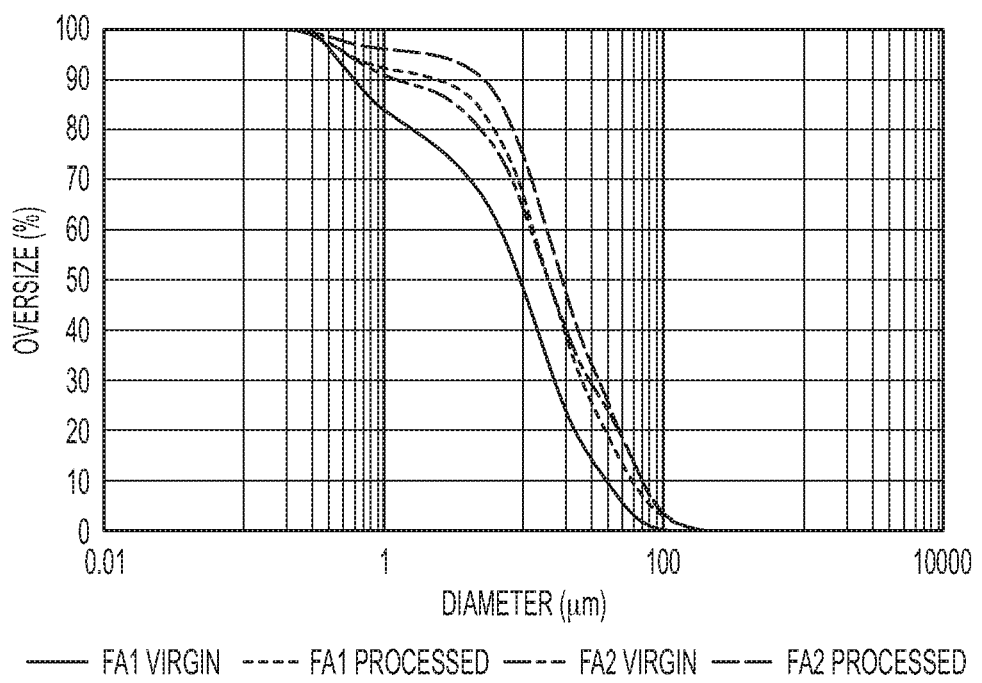
FIG. 5 is a graph showing the particle size distribution of two processed high calcium fly ash samples compared to their virgin class C fly ash counterparts with the y-axis showing the percentage of particles exceeding the various particle diameters shown on the x-axis in accordance with an exemplary embodiment of the invention.

FIG. 5 is a graph showing the particle size distribution of two processed high calcium class C fly ash samples compared to their virgin high calcium class C fly ash counterparts with the y-axis showing the percentage of particles exceeding the various particle diameters shown on the x-axis. This figure shows the processed high calcium fly ash material has been returned to a similar particle size distribution to that of its precursor virgin high calcium fly ash.

Along the same lines, Table 1 shows specific surface area (SSA) results obtained by Brunauer-Emmett-Teller (BET) specific surface area analysis for five processed and virgin high calcium class C fly ash samples, including FA1 virgin and FA1 processed shown in FIG. 5. The results show the SSA of processed high calcium fly ash is higher than that of virgin high calcium fly ash, which shows that particle surfaces in the high calcium fly ash have been re-exposed during the processing of the high calcium fly ash, such as during grinding. This re-exposed particles surfaces in the processed high calcium fly ash provide sites for the pozzolanic reaction to occur on the surface of high calcium fly ash after grinding during processing. Therefore, as can be seen, the specific surface area of the processed high calcium fly ash can be increased by grinding during processing, when compared to virgin high calcium fly ash.

TABLE 1

Specific Surface Area of Five Virgin and Processed High Calcium Fly Ash Samples

| | BET SSA ($m^2/g$) |
|---|---|
| FA1 Virgin | 2.62 |
| FA1 Processed | 5.59 |
| FA2 Virgin | 1.25 |
| FA2 Processed | 3.12 |
| FA3 Virgin | 0.6 |
| FA3 Processed | 6.48 |
| FA4 Virgin | 2.06 |
| FA4 Processed | 1.59 |
| FA5 Virgin | 0.4 |
| FA5 Processed | 13.56 |

In an embodiment, the SSA of the processed high calcium fly ash is between about 1.5-15 $m^2/g$, preferably between about 2-10 $m^2/g$, and most preferably between about 3-5 $m^2/g$.

It is noted that increasing the SSA of the processed high calcium fly ash can lead to an increase in the water requirement. Having too much unreacted water in the concrete will weaken the concrete. It is noted that, an increase in SSA and replacement percentage of processed high calcium fly ash should be balanced to maintain correct water consumption requirement. Therefore, in one exemplary embodiment, the processed high calcium fly ash SSA is selected such that the mortar mixture requires less than 105% of the water required by control (a mortar mixture with 100% cement), when the mortar mixtures contains about 20% processed high calcium fly ash and about 80% cement. Therefore, in one exemplary embodiment, the processed high calcium fly ash SSA is selected such that the mortar mixture requires less than 110% of the water required by control (a mortar mixture with 100% cement), when the mortar mixtures contains about 20% processed high calcium fly ash and about 80% cement.

Accordingly, in one exemplary embodiment, the processed high calcium fly ash SSA is selected such that the cementitious mixture requires less than 105% of the water required by control (a cementitious mixture with 100% cement), when the cementitious mixtures contains about 20% processed high calcium fly ash and about 80% cement. Therefore, in one exemplary embodiment, the processed high calcium fly ash SSA is selected such that the cementitious mixture requires less than 110% of the water required by control (a cementitious mixture with 100% cement), when the cementitious mixtures contains about 20% processed high calcium fly ash and about 80% cement.

Figure 6:
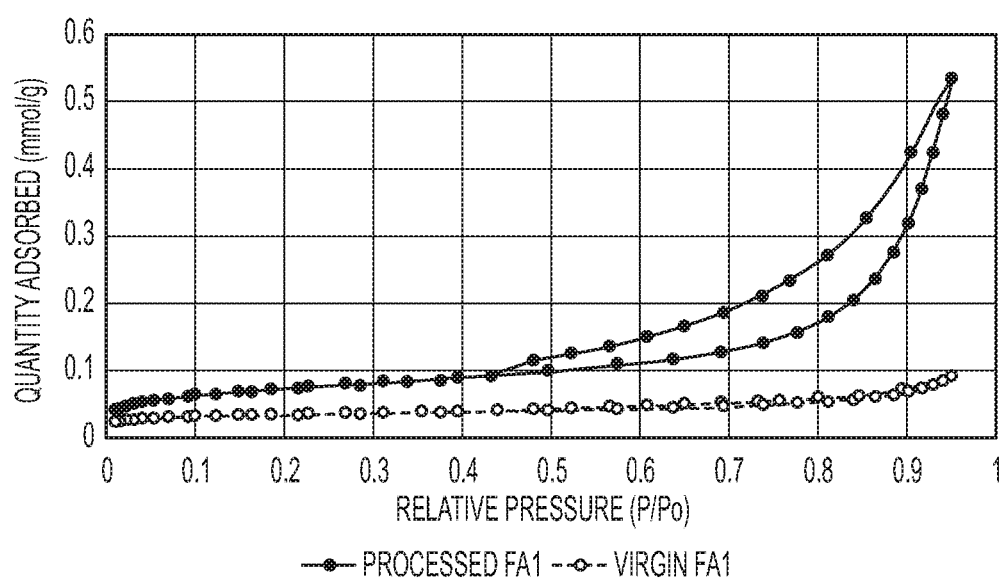
FIG. 6 is a graph showing the isotherm adsorption/desorption curves of virgin and processed high calcium fly ash with the quantity adsorbed on the y-axis and the relative pressure on the x-axis in accordance with an exemplary embodiment of the invention.

FIG. 6 is a graph showing the isotherm adsorption/desorption curves of virgin and processed high calcium class C fly ash with the quantity adsorbed on the y-axis and the relative pressure on the x-axis. Upon review of FIG. 6, it can be seen that a more noticeable hysteresis loop is present in the processed high calcium class C fly ash, when compared to the trace for the virgin high calcium class C fly ash. This more noticeable hysteresis loop present for processed high calcium fly ash is an indication that the processing of the high calcium fly ash has increased the amount of slit-like mesopores, versus the virgin high calcium fly ash. This suggests, that not only has the processing of the high calcium fly ash increased the specific surface area of the high calcium fly ash, when compared to the virgin high calcium fly ash, but also that the processing of the high calcium fly ash generates mesoporous hydrates, which are not present in the virgin high calcium fly ash.

The presence of the mesoporous hydrates in the processed high calcium fly ash indicates that the processing of the high calcium fly ash at least partially nullifies the effect of reactive calcium that was present in the high calcium fly ash, thus neutralizing the cementitious reactivity of the high calcium fly ash. This is in contrast to virgin high calcium fly ash, in which the cementitious reactivity is maintained.

Figure 7:
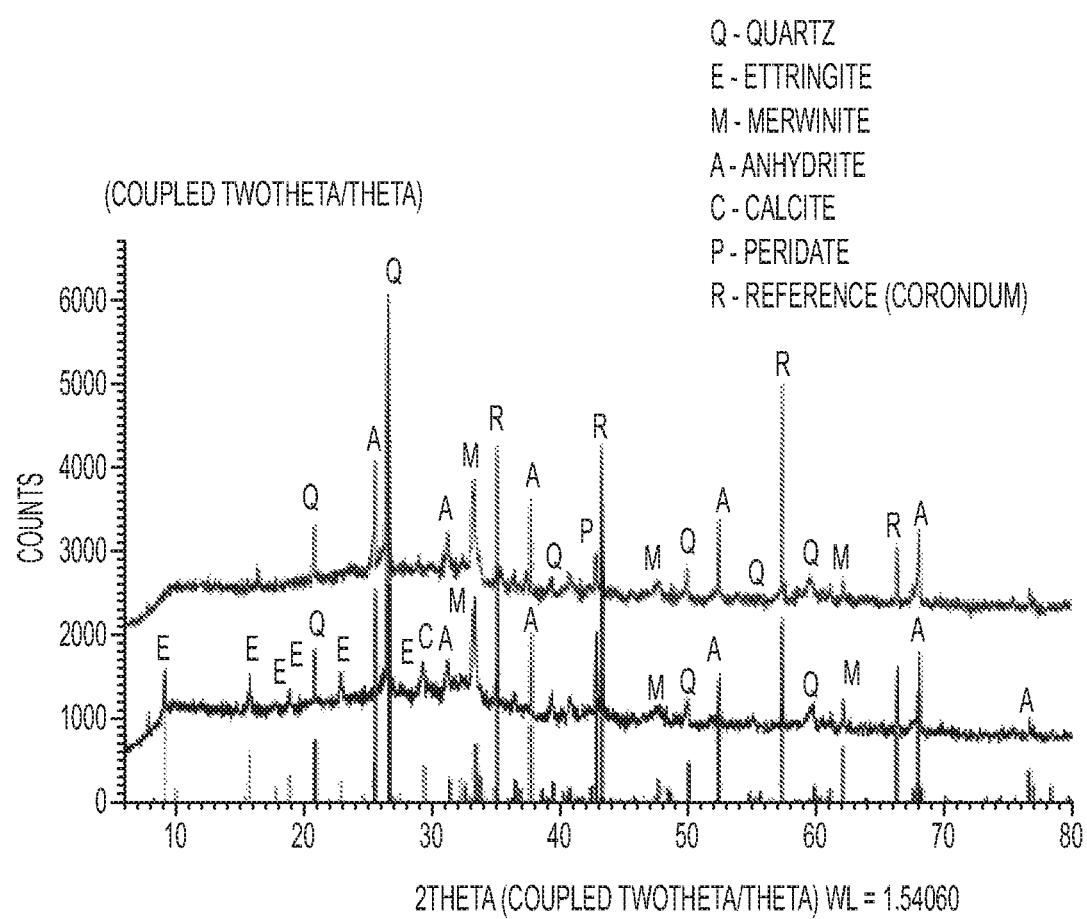
FIG. 7 is a graph showing the X-ray diffraction (XRD) patterns of virgin class C fly ash and processed high calcium fly ash in accordance with an exemplary embodiment of the invention.

FIG. 7 is a graph showing the X-ray diffraction (XRD) patterns of virgin high calcium class C fly ash and processed high calcium class C fly ash. Further, table 2 is a quantitative XRD analysis of the high calcium class C fly ash before and after processing. Upon review of the XRD patterns and analysis, evidence of hydration and subsequent carbonation can be seen in the samples in the form of primary ettringite and calcium carbonate (calcite), respectively. This demonstrates that the processed high calcium fly ash is being hydrated during processing and neutralized, thereby neutralizing the hydraulic activity of the processed high calcium fly ash. This also shows that processed high calcium fly ash has undergone a partial carbonation during processing.

Also shown is the processing of the high calcium fly ash promotes the formation of primary ettringite and calcium carbonate. When comparing virgin high calcium fly ash with processed high calcium fly ash, the formation of the primary ettringite and calcium carbonate in the processed high calcium fly ash increases the effectiveness of the processed high calcium fly ash at mitigating sulfate attack, when the processed high calcium fly ash partially replaces cement in concrete.

Table 2 contains the results of an XRD analysis of the same high calcium fly ash from FIG. 7 before and after processing (virgin and processed high calcium fly ash). Table 2 confirms the processed high calcium fly ash contains about 6% hydrates and carbonates. This also confirms the reactive calcium present in the virgin high calcium fly ash has been neutralized during processing and is no longer present in the processed high calcium fly ash, thus neutralizing the cementitious reactivity of the high calcium fly ash. Further, these results also confirm processed high calcium fly ash still contains a high amount of amorphous material, which is often associated with pozzolanic reactivity. Thus, the processing maintains the pozzolanic reactivity of the high calcium fly ash. In one exemplary embodiment, the amount of amorphous material contained with the processed high calcium fly ash is about 64%. In another exemplary embodiment, the amount of amorphous material contained with the processed high calcium fly ash is greater than about 40%. In an additional exemplary embodiment, the amount of amorphous material contained with the processed high calcium fly ash is greater than about 60%.

TABLE 2

XRD Quantitative Analysis of Virgin and Processed High Calcium Class C Fly Ash FA1

|  | FA1 Virgin | FA1 Processed |
| --- | --- | --- |
| Quartz | 8.70% | 8.93% |
| Hematite | 6.73% | 5.78% |
| Periclase | 2.55% | 2.89% |
| Ettringite | 0% | 4.57% |
| Calcite | 0% | 1.90% |
| Anhydrite | 1.98% | 1.79% |
| Merwinite | 13.18% | 10.27% |
| Amorphous | 66.82% | 63.63% |

Further, it has been found that replacing Portland cement by an equal mass of processed high calcium fly ash in concrete can result in lower early-age strengths, however, long-term strengths are improved. This improvement in strength development at later ages is attributed to the pozzolanic reactivity that is maintained during the processing of the high calcium fly ash.

Figure 8:
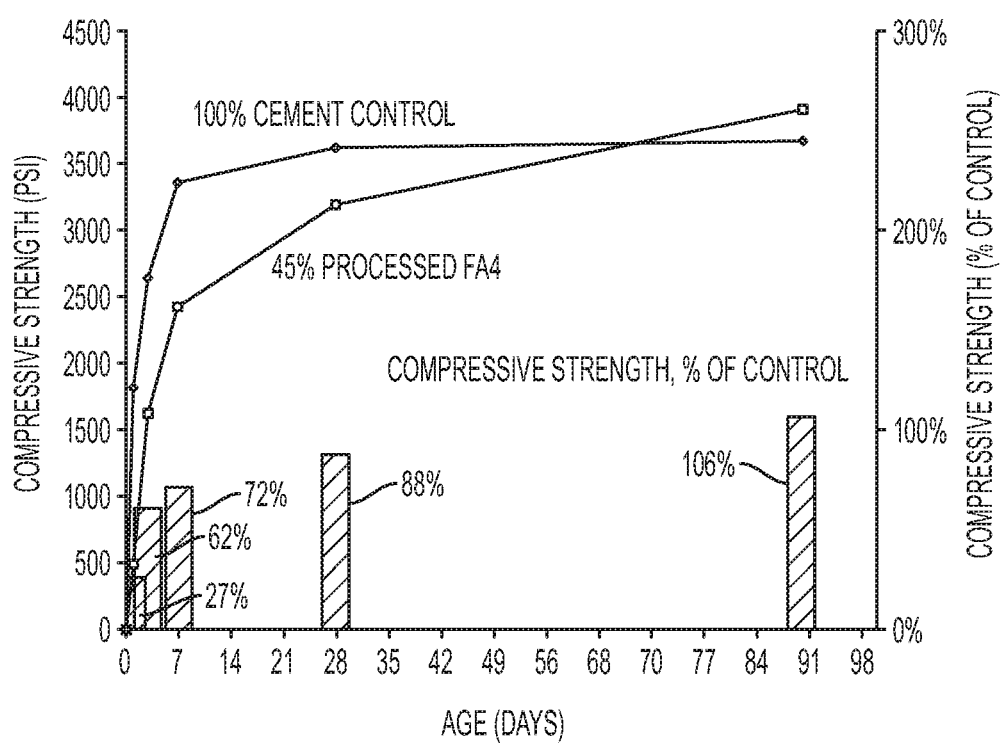
FIG. 8 is an overlaid graph and chart showing the compressive strength of mortar containing processed high calcium fly ash and 100% cement mortar with the compressive strength on the y-axis and the x-axis showing time after hydration in accordance with an exemplary embodiment of the invention.

FIG. 8 is an overlaid graph and chart showing the compressive strength of 100% cement mortar and a mortar where 45% of the Portland cement has been replaced with processed class C fly ash. The compressive strength is shown on the y-axis of FIG. 8 and the time after hydration is shown on the x-axis. FIG. 8 highlights the improvement in later-age strengths provided by the processed high calcium fly ash, further demonstrating that the pozzolanic sites of the high calcium fly ash are in fact re-exposed and active after its processing. Therefore, this again shows that the processing of the high calcium fly ash conserves the pozzolanic reactivity of the high calcium fly ash.

In an exemplary embodiment, the compressive strength of a mortar mixture containing about 20% processed high calcium fly ash and about 80% cement is greater than about 70% of the compressive strength of control (a mortar mixture with 100% cement). In another exemplary embodiment, the compressive strength of a mortar mixture containing about 20% processed high calcium fly ash and about 80% cement is greater than about 80% of the compressive strength of control (a mortar mixture with 100% cement).

Further, in an exemplary embodiment, the compressive strength of a cementitious mixture containing about 20% processed high calcium fly ash and about 80% cement is greater than about 70% of the compressive strength of control (a cementitious mixture with 100% cement). In another exemplary embodiment, the compressive strength of a cementitious mixture containing about 20% processed high calcium fly ash and about 80% cement is greater than about 80% of the compressive strength of control (a cementitious mixture with 100% cement).

Thus, the processing of the high calcium fly ash neutralizes the hydraulic activity of the high calcium fly ash, while conserving the pozzolanic reactivity of the high calcium fly ash. Thereby, the processed high calcium fly ash enhances the performance of concrete when a portion of the cement is replaced by the processed high calcium fly ash.

Turning to table 3 below, the table shows the calcium hydroxide (Ca(OH)$_2$) content of cement paste monitored at different ages, namely 7 days, 28 days, and 56 days after hydration of the cement paste. The table shows the calcium hydroxide content for the cement control paste (100% cement), cement paste where 20% of the cement was replaced with virgin high calcium class C fly ash taken from location FA2, cement paste where 20% of the cement was replaced with processed high calcium class C fly ash taken from location FA2, cement paste where 20% of the cement was replaced with virgin high calcium class C fly ash taken from location FA3, and cement paste where 20% of the cement was replaced with processed high calcium class C fly ash taken from location FA3.

TABLE 3

Calcium Hydroxide Consumption on Cement Paste

| | Amount of Ca(OH)$_2$ (g)/g of cement | | |
|---|---|---|---|
| | 7 days | 28 days | 56 days |
| Cement Control | 0.2331 | 0.2173 | 0.2063 |
| FA2 Virgin | 0.2184 | 0.2068 | 0.2059 |
| FA2 Processed | 0.2139 | 0.1864 | 0.1831 |
| FA3 Virgin | 0.2412 | 0.1843 | 0.1833 |
| FA3 Processed | 0.1959 | 0.1998 | 0.1748 |

The results show that paste samples with 20% replacement of processed high calcium fly ash contain a lower amount of calcium hydroxide per gram of cement at 28 and 56 days than a control cement paste. This demonstrates that that processed high calcium fly ash contains active pozzolanic sites that consume extra calcium hydroxide, thus lowering the calcium hydroxide content of the cement paste samples with replacement of processed high calcium fly ash, when compared to the control cement paste (100% cement).

In an embodiment, cementitious paste with 20% replacement of cement with processed high calcium fly ash has at least about 3% less calcium hydroxide per gram of cement than control cementitious paste (100% cement—made with no fly ash) at 28 days after hydration of the cementitious paste. In another embodiment, cementitious paste with 20% replacement of cement with processed high calcium fly ash has at least about 5% less calcium hydroxide per gram of cement than control cement paste (100% cement—made with no fly ash) at 28 days after hydration of the cementitious paste. In a further embodiment, cementitious paste with 20% replacement of cement with processed high calcium fly ash has at least about 10% less calcium hydroxide per gram of cement than control cement paste (100% cement—made with no fly ash) at 28 days after hydration of the cementitious paste.

Therefore, in an exemplary embodiment, cementitious mixture with 20% replacement of cement with processed high calcium fly ash has at least about 3% less calcium hydroxide per gram of cement than control cementitious mixture (100% cement—made with no fly ash) at 28 days after hydration of the cementitious mixture. In another exemplary embodiment, cementitious mixture with 20% replacement of cement with processed high calcium fly ash has at least about 5% less calcium hydroxide per gram of cement than control cementitious mixture (100% cement—made with no fly ash) at 28 days after hydration of the cementitious mixture. In a further exemplary embodiment, cementitious mixture with 20% replacement of cement with processed high calcium fly ash has at least about 10% less calcium hydroxide per gram of cement than control cementitious mixture (100% cement—made with no fly ash) at 28 days after hydration of the cementitious mixture.

Because calcium hydroxide can potentially react with soluble sulfur to form delayed ettringite, the processed high calcium fly ash reduces the risk of internal sulfate attack in concrete is reduced. Therefore, since the pozzolanic reactivity is maintained in the processed high calcium fly ash, the pozzolanic sites remain available to react with the calcium hydroxide in the concrete. The reaction of the calcium hydroxide at the pozzolanic sites reduces the amount of calcium hydroxide available to react with the soluble sulfur to form delayed ettringite, thereby reducing the risk of internal sulfate attack.

Figure 9:
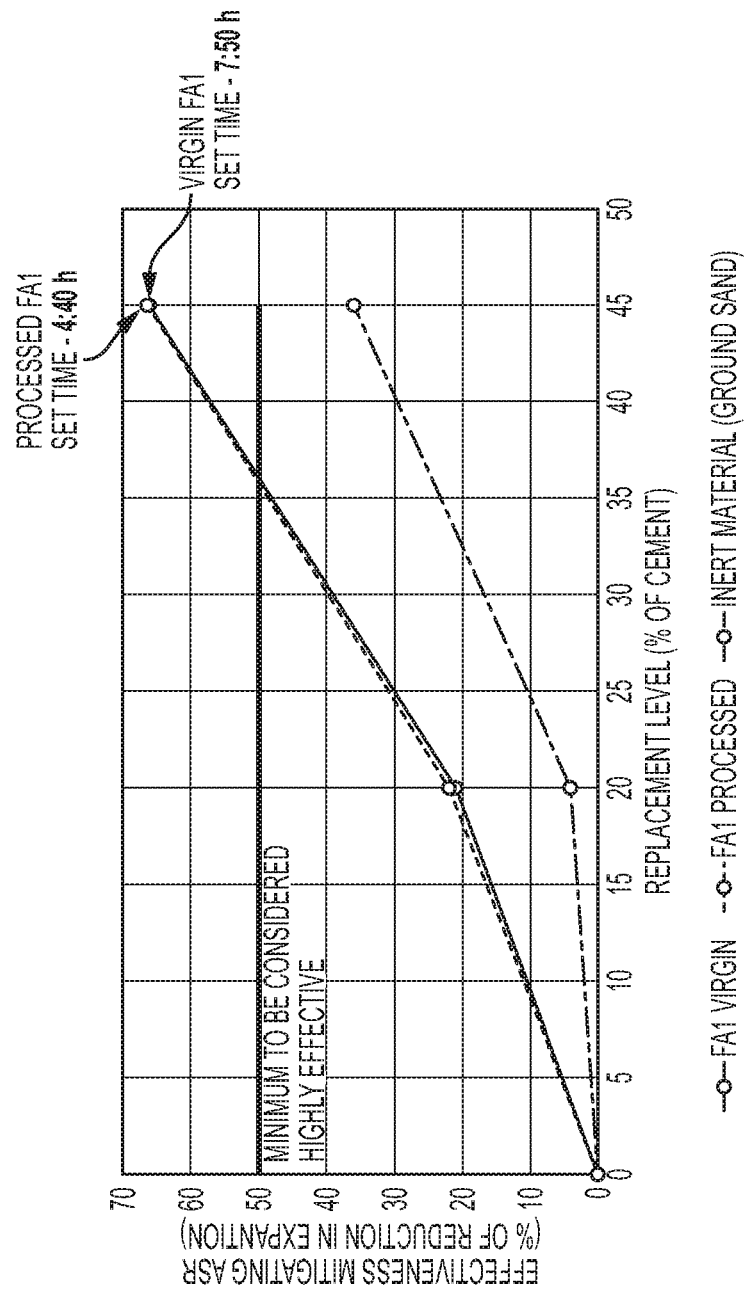
FIG. 9 is a chart showing the effectiveness of ASR mitigation for cement containing processed high calcium fly ash according to ASTM C 441 and set time with the y-axis showing the effectiveness of mitigating ASR and the x-axis showing the replacement level of the cement with processed class C fly ash in accordance with an exemplary embodiment of the invention.

FIG. 9 is a chart showing the effectiveness of alkali-silica reaction (ASR) mitigation for cement containing processed high calcium class C fly ash according to ASTM C 441 (mortar) and set time. The y-axis of FIG. 9 shows the effectiveness of mitigating ASR and the x-axis shows the replacement level of the cement with processed high calcium class C fly ash. As can be seen upon review of FIG. 9, the high calcium fly ash remains an effective ASR mitigator after processing because the processed high calcium fly ash reduces expansion of the concrete, which further demonstrates that pozzolanic sites in the high calcium fly ash remain unreacted during processing. Stated alternatively, this demonstrates that the pozzolanic reactivity in the high calcium fly ash is maintained during processing.

The high calcium fly ash would no longer remain an effective ASR mitigator after processing, if the pozzolanic sites in the high calcium fly ash did not remain unreacted during processing. Stated alternatively, the high calcium fly ash would no longer remain an effective ASR mitigator after processing, if the pozzolanic reactivity of the high calcium fly ash was not maintained during processing.

Turning to table 4 below, the table shows the set time of cement mixtures containing processed high calcium fly ash are not increased by the presence of the high calcium fly ash. This is due to the fact that the pre-hydration during the processing of the high calcium fly ash neutralizes the reactive calcium in the high calcium fly ash, thereby neutralizing the cementitious reactivity of the high calcium fly ash.

TABLE 4

Cement Set Times

| | Cement Control | 45% Virgin High Calcium Fly Ash FA1 | 45% Processed High Calcium Fly Ash FA1 |
|---|---|---|---|
| Set Time (hh:mm) | 4:45 | 7:50 | 4:40 |
| Set Time (percent of Cement Control) | — | 165% | 98% |
| Effectiveness Mitigating ASR (% reduction in expansion) | — | 66% | 66% |

More specifically, high calcium fly ash can be used to effectively reduce the risk of ASR in concrete by replacing cement with upwards of 20% of high calcium fly ash, especially when highly-reactive aggregates are used. However, a concrete mixture where 30-60% of the cement is replaced by virgin high calcium fly ash will produce set times at least 30% longer than control (concrete mixture with no high calcium fly ash—100% concrete), with some set times being even up to 50% longer than control (concrete mixture with no high calcium fly ash—100% concrete). This is highly inconvenient as it creates delays for the worker crews that have to wait for the concrete to set in order to perform post-concrete pour operations. However, when processed high calcium fly ash is used to replace concrete, as opposed to virgin high calcium fly ash, users can greatly reduce the risk of ASR, and reduce the amount of embodied $CO_2$, in concrete by replacing about 30% to 60% of the cement content with processed high calcium fly ash, while maintaining the setting time at less than about 105-110% of a cement control mixture.

Therefore, the risk of abnormal set times for concrete and the amount of embodied $CO_2$ in concrete is reduced through the use of processed high calcium fly ash or a blend of virgin and processed high calcium fly ash. This is due to the fact that the hydration, or pre-hydration, during the processing of the high calcium fly ash neutralizes the reactive calcium in the high calcium fly ash, thereby neutralizing the cementitious reactivity of the high calcium fly ash.

Accordingly, in an exemplary embodiment, the set time of a cementitious mixture is less than or equal to about 105% of the set time of control (100% cement), where about 30-60% of the cement in the cementitious mixture is replaced by processed high calcium fly ash. In another exemplary embodiment, the set time of a cementitious mixture is less than or equal to about 110% of the set time of control (100% cement), where about 30-60% of the cement in the cementitious mixture is replaced by processed high calcium fly ash. In a further exemplary embodiment, the set time of a cementitious mixture is less than or equal to about 120% of the set time of control (100% cement), where about 30-60% of the cement in the cementitious mixture is replaced by processed high calcium fly ash. In an additional exemplary embodiment, the set time of a cementitious mixture is less than or equal to about 105-120% of the set time of control (100% cement), where about 15-60% of the cement in the cementitious mixture is replaced by processed high calcium fly ash. In a further exemplary embodiment, the set time of a cementitious mixture is less than or equal to about 105-120% of the set time of control (100% cement), where greater than about 25% of the cement in the cementitious mixture is replaced by processed high calcium fly ash. In an additional exemplary embodiment, the set time of a cementitious mixture is less than or equal to about 105-120% of the set time of control (100% cement), where greater than about 5% of the cement in the cementitious mixture is replaced by processed high calcium fly ash. Further, an amount of CO2 embodied in concrete is reduced, compared with control (100% cement), when a portion of the cement is a cementitious mixture is replaced by high processed calcium fly ash. Additionally, an amount of energy embodied in concrete is reduced, compared with control (100% cement), when a portion of the cement is a cementitious mixture is replaced by high processed calcium fly ash.

Therefore, FIGS. 4 and 9 and table 4 below show that the risk of ASR can be reduced by increasing the amount processed high calcium fly ash (or virgin/processed blends) with respect to cement, without having an undesirable effect of extending the time of set.

Table 5 below shows the characterization and testing of processed high calcium fly ash inter-ground with a source of sulfate, namely clinker and gypsum, to produce blended cement. The results contained in this table show that processed fly ash can be inter-ground with clinker and gypsum at different levels to produce blended cement meeting the requirements of ASTM C 595. The sulfate provided by the clinker and gypsum are available to balance the sulfate content in the cementitious system containing the processed high calcium fly ash, since at least part of the readily soluble sulfate in the high calcium fly ash was consumed during processing to form primary ettringite.

TABLE 5

Characterization and Testing of Inter-ground Processed High Calcium Fly Ash With Clinker and Gypsum

| | | Cement Control (Clinker + 3.75% Gypsum) | IP 15 (15% Processed fly ash) | IP 20 (20% Processed fly ash) | IP 25 (25% Processed fly ash) |
|---|---|---|---|---|---|
| Chemical Analysis | Magnesium Oxide (MgO), % | 2.12 | 2.46 | 2.53 | 2.65 |
| | Sulfate ($SO_3$), % | 2.08 | 2.31 | 2.4 | 2.46 |
| | Loss on Ignition, % | 0.43 | 1.58 | 1.77 | 2.07 |
| Physical Analysis | Fineness, % retained on 325 mesh | 12.62 | 10.6 | 9.45 | 13.77 |
| | Autoclave Length Change, % of control | 0.023 | 0.012 | 0.007 | 0.06 |
| | Time of Initial Setting, hh:mm, Vicat Test | 2:15 | 2:15 | 2:30 | 2:30 |
| | Air Content of Mortar, volume, % | 7.3 | 4.93 | 4.41 | 2.96 |
| Compressive Strength, psi | 3 days | 2751 | 2653 | 2733 | 2557 |
| | 7 days | 3600 | 3838 | 3623 | 3622 |
| | 28 days | 5048 | 5565 | 5454 | 5148 |

Table 6 shows the characterization and testing of blends of cement and processed high calcium fly ash. The results contained in this table show that processed high calcium fly ash can be blended with cement at different levels to produce blended cement meeting the requirements of ASTM C 595.

TABLE 6

Characterization and Testing of Processed High Calcium Fly ash/Cement Blends

| | | Cement Control | IP 20 (20% Processed fly ash) | IP 30 (30% Processed fly ash) | IP 40 (40% Processed fly ash) |
|---|---|---|---|---|---|
| Chemical Analysis | Magnesium Oxide (MgO), % | 2.94 | 3.14 | 3.25 | 3.34 |
| | Sulfate (SO$_3$), % | 2.84 | 2.14 | 2.07 | 1.98 |
| | Loss on Ignition, % | 1.06 | 1.28 | 1.58 | 1.79 |
| Physical Analysis | Fineness, % retained on 325 mesh | 2.67 | 7.62 | 9.68 | 11.28 |
| | Autoclave Length Change, % of control | 0.0025 | 0.019 | 0.033 | 0.026 |
| | Time of Initial Setting, hh:mm, Vicat Test | 3:00 | 3:30 | 3:45 | 4:15 |
| | Air Content of Mortar, volume % | 6.61 | 4.67 | 4.76 | 5.14 |
| Compressive Strength, psi | 3 days | 3890 | 2947 | 2446 | 2017 |
| | 7 days | 4957 | 3918 | 3327 | 3108 |
| | 28 days | 6573 | 5488 | 5255 | 4907 |

Figure 10:
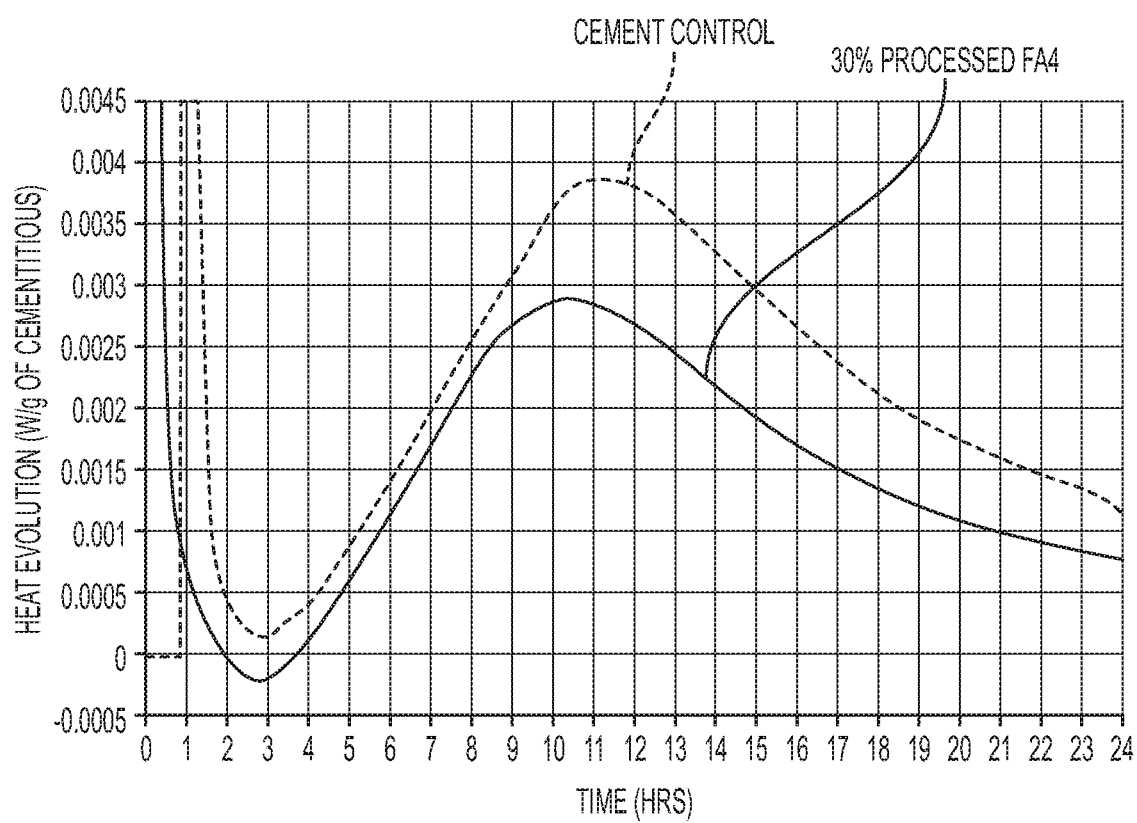
FIG. 10 is a graph showing the heat evolution of cement control and cement paste blends containing high calcium fly ash with the x-axis showing time after hydration in accordance with an exemplary embodiment of the invention.

FIG. 10 is a graph showing the heat evolution of cement control and cement paste blends containing high calcium fly ash with the x-axis showing time after hydration. While it is necessary for some heat to be present in concrete as it cures, too much heat can cause cracking due to thermal stress. As can be seen upon review of FIGS. 3, 9, and 10, the addition of processed high calcium fly ash to cement allows for the reduction in heat generation by increased replacement of cement with high calcium fly ash, while maintaining virtually no set time delay. This is a relatively lower heat generation compared to when virgin high calcium fly ash is added to cement.

As was previously stated, this disclosure is also directed to a method for processing the high calcium fly ash discussed above. Once processed, the high calcium fly ash is called processed high calcium fly ash. As was previously stated, prior to processing, the high calcium fly ash has cementitious reactivity due to containing reactive calcium, such as calcium oxide (CaO) and/or calcium aluminate in an amount sufficient to lead to the negative effects discussed above when used in cement and concrete. The negative effects attributed to the cementitious activity of high calcium fly ash include, but are not limited to abnormal set times and susceptibility to sulfate attack. Prior to processing, the high calcium flu ash also has cementitious reactivity, which is maintained during the processing.

In an exemplary embodiment, the processing of the high calcium fly ash includes hydrating the high calcium fly ash with water and carbonating the hydrates and/or free lime in the high calcium fly ash with carbon dioxide. In an exemplary embodiment, this hydrating can take place in locations including, but not limited to, a landfill or surface impoundment. Further, in an exemplary embodiment, the carbonating can be in the form of exposing the high calcium fly ash to atmospheric carbon dioxide in the landfill or surface impoundment. The above discussed hydrating and carbonating can also be characterized as pre-hydrating and pre-carbonating, since they are taking place prior to the hydrating and carbonating of the processed high calcium fly ash in a cementitious mixture or concrete. The objective of this processing is to hydrate the reactive calcium in the high calcium fly ash in network modifier roles, thereby reducing or nullifying further cementitious reactivity caused by the reactive calcium (calcium oxide). The hydrates generated during this processing carbonate over time, especially when exposed to the environment. Since the high calcium fly ash is reacted in the absence of hydraulic cement during this processing, and thus without the required calcium hydroxide and alkalinity provided by the cement for the pozzolanic reaction to take place, the pozzolanic sites are left unreacted following hydration and carbonation. Thereby pozzolanic reactivity is maintained in the processed high calcium fly ash.

Even though the pozzolanic activity is maintained in the hydrated and carbonated high calcium fly ash, the cementitious reactivity of the high calcium fly ash is neutralized due to the neutralization of the reactive calcium, such as calcium aluminate and/or calcium oxide, during the hydration and carbonation of the high calcium fly ash. Since the reactive calcium is neutralized, the processed high calcium fly ash does not disturb the balance of the reactive calcium in the cement. Having an excess of reactive calcium in the mixture can lead to undesirable events, such as flash set, due to early heat during set generated by the excess reactive calcium. Thereby, since the hydration and carbonation of the high calcium fly ash neutralizes the reactive calcium, the cementitious reactivity of the high calcium fly ash is neutralized, while the pozzolanic activity of the high calcium fly ash is maintained.

The method further includes excavating the hydrated and carbonated high calcium fly ash. In an exemplary embodiment, the hydrated and carbonated high calcium fly ash can be excavated (reclaimed) from the landfill or surface impoundment through excavation. In some exemplary embodiments, the hydrated and carbonated high calcium fly ash is at least partially dried prior to excavation (reclamation).

The method can also include crushing the excavated high calcium fly ash to a size acceptable for the dryer. In an exemplary embodiment, the excavated high calcium fly ash can be crushed to a size sufficient to pass through −¾" to −⅛" mesh. In another exemplary embodiment, the excavated high calcium fly ash can be crushed to a size sufficient to pass through −⅜" to −½" mesh.

Additionally, the method can include drying the crushed high calcium fly ash using a dryer. In an exemplary embodiment, the crushed high calcium fly ash is dried until the high calcium fly ash has a moisture content of 1-5%.

Further, the method can include grinding the dried high calcium fly ash to a particle size distribution similar to that of virgin or as-produced run-of-plant fresh high calcium fly ash. The grinding re-exposes the particle surfaces in the high calcium fly ash, thereby providing sites for the pozzolanic reaction to occur.

In an exemplary embodiment, the grinding can include inter-grinding the dried high calcium fly ash at a cement production plant. In a further exemplary embodiment, the grinding can be low energy milling. In an exemplary embodiment, a grinder can be one or more of a roller mill, stir media mill or a ball mill.

Since at least part of the readily soluble sulfate in the high calcium fly ash is consumed during processing to form primary ettringite, such as during the hydration and carbonation, the consumed sulfate is not available for balancing the sulfate content in cementitious systems containing the processed high calcium fly ash. Therefore, the method can also include incorporating sulfate into the high calcium fly ash, such as by blending or inter-grinding the high calcium fly ash with a source of sulfate. The blending or inter-grinding can take place during or after grinding the dried high calcium fly ash to obtain an optimum sulfate content. In an exemplary embodiment, the source of sulfate may be clinker and/or gypsum.

In an exemplary embodiment, the dried high calcium fly ash can be ground to a size of less than about 35% of the ground high calcium fly ash is retained on 325 mesh (about 35% of particles are larger than 45 microns). In another exemplary embodiment, the dried high calcium fly ash can be ground to a size of less than about 10% of the ground high calcium fly ash is retained on 325 mesh (about 10% of particles are larger than 45 microns). In an exemplary embodiment, the dried high calcium fly ash can be ground to a size of less than about 0% of the ground high calcium fly ash is retained on 325 mesh (all of particles are smaller than 45 microns).

Upon grinding, the ground high calcium fly ash is processed high calcium fly ash having the properties described and shown in the figures, tables, and corresponding text above, and can be stored until it is to be used in a cementitious mixture. Thus, when used in a cementitious mixture, the processed high calcium fly ash has neutralized cementitious reactivity, such as is evidenced by reducing set times, while maintaining pozzolanic reactivity, when compared to cement mixtures containing only virgin high calcium fly ash. In an exemplary embodiment, the processed high calcium fly ash can be used in a portland-pozzolan blended cement mixture. The portland-pozzolan blended cement mixture can include clinker, gypsum, and a pozzolanic material. The pozzolanic material can include processed high calcium fly ash, While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention. Combinations of the above embodiments and other embodiments will be apparent to those of skill in the art upon studying the above description and are intended to be embraced therein. Therefore, the scope of the present invention is defined by the appended claims, and all devices, processes, and methods that come within the meaning of the claims, either literally or by equivalence, are intended to be embraced therein.

The invention claimed is:

1. A method for enhancing the performance of concrete comprising:
    providing a cementitious mixture comprising cement and processed high calcium fly ash, wherein a processing of said processed high calcium fly ash neutralizes a cementitious reactivity of a high calcium fly ash, and said processing of said high calcium fly ash comprises:
    hydrating and carbonating said high calcium fly ash; and
    excavating said high calcium fly ash from a landfill or surface impoundment after said hydrating and carbonating;
    wherein a pozzolanic reactivity of said processed high calcium fly ash is maintained during said processing of said high calcium fly ash.

2. The method of claim 1, wherein a calcium oxide content of said high calcium fly ash is greater than about 10% prior to said neutralization of said cementitious reactivity of said high calcium fly ash.

3. The method of claim 1, wherein a calcium oxide content of said high calcium fly ash is greater than about 15% prior to said neutralization of said cementitious reactivity of said high calcium fly ash.

4. The method of claim 1, wherein about 30-60% of the cement in said cementitious mixture is replaced with said processed high calcium fly ash, and a set time of said cementitious mixture is less than or equal to about 120% of the set time of a control, said control is 100% cement,
    wherein replacing said cement in said cementitious mixture with said processed high calcium fly ash reduces a risk of an alkali-silica reaction in said cementitious mixture.

5. The method of claim 1, wherein said processing of said high calcium fly ash further comprises grinding said high calcium fly ash after neutralization and hydration, wherein said grinding of said high calcium fly ash during said processing exposes a particle surface on said high calcium fly ash with sites for pozzolanic reactions to occur.

6. The method of claim 5, wherein a specific surface area of said particle surface is between about 1.5-15 m2/g after said grinding.

7. A portland-pozzolan blended cement mixture comprising:
    clinker, gypsum, and a pozzolanic material, said pozzolanic material being comprised of processed high calcium fly ash,
    wherein a processing of said processed high calcium fly ash neutralizes a cementitious reactivity of a high calcium fly ash while maintaining a pozzolanic reactivity of said high calcium fly ash.

8. The cement mixture of claim 7, wherein said clinker is ground at a cement plant and blended with said gypsum and virgin fly ash and said processed high calcium fly ash.

9. The cement mixture of claim 7, wherein said processing of said high calcium fly ash comprises hydrating and carbonating said high calcium fly ash;

said processing further comprises excavating said high calcium fly ash from a landfill or surface impoundment after said hydrating and carbonating.

10. The cement mixture of claim 9, wherein a calcium oxide content of said high calcium fly ash is greater than about 10% prior to said neutralization of said cementitious reactivity of said high calcium fly ash.

11. The cement mixture of claim 9, wherein a calcium oxide content of said high calcium fly ash is greater than about 15% prior to said neutralization of said cementitious reactivity of said high calcium fly ash.

12. The cement mixture of claim 9, wherein about 30-60% of the cement in said cement mixture is replaced with said processed high calcium fly ash, and a set time of said cement mixture is less than or equal to about 120% of the set time of a control, said control is 100% cement, wherein replacing said cement in said cement mixture with said processed high calcium fly ash reduces a risk of an alkali-silica reaction in said cement mixture.

13. The cement mixture of claim 12, wherein a set time of said cement mixture is less than or equal to about 110% of the set time of said control.

14. The cement mixture of claim 13, wherein a set time of said cement mixture is less than or equal to about 105% of the set time of said control.

15. A method for processing high calcium fly ash, comprising:
reclaiming a high calcium fly ash, wherein said high calcium fly ash is hydrated and neutralized before reclaiming; and
processing said high calcium fly ash by hydrating and carbonating said high calcium fly ash, wherein said processing neutralizes a cementitious reactivity of said high calcium fly ash;
wherein said reclaiming comprises excavating said high calcium fly ash from a landfill or surface impoundment after said hydrating and carbonating; and
wherein a pozzolanic reactivity of said high calcium fly ash is maintained during said processing of said high calcium fly ash.

16. The method of claim 15, wherein said processing of said high calcium fly ash further comprises grinding said high calcium fly ash after excavating said high calcium fly ash, wherein said grinding of said high calcium fly ash during said processing exposes a particle surface on said high calcium fly ash with sites for pozzolanic reactions to occur.

17. The method of claim 16, wherein a specific surface area of said particle surface is between about 1.5-15 m2/g after said grinding.

18. The method of claim 16, wherein a specific surface area of said particle surface is between about 2-10 m2/g after said grinding.

* * * * *